United States Patent [19]

Kubo et al.

[11] Patent Number: 4,799,838
[45] Date of Patent: Jan. 24, 1989

[54] MILLING CUTTER

[75] Inventors: Haruaki Kubo, Osaka; Mitsuru Umeda; Hiromitsu Iwakoshi, both of Hiroshima, all of Japan

[73] Assignees: Daishowa Seiki Co., Ltd., Osaka; Mitsubishi Jukogyo Kabushiki Kaisha, Tokyo, both of Japan

[21] Appl. No.: 849,418

[22] Filed: Apr. 8, 1986

[30] Foreign Application Priority Data

Apr. 16, 1985 [JP] Japan ................. 60-56733[U]

[51] Int. Cl.$^4$ ............................................. B23C 5/26
[52] U.S. Cl. ............................. 409/234; 279/15; 279/8; 408/146
[58] Field of Search ............................. 279/7, 8, 15, 83; 408/239 R, 146; 409/232, 234

[56] References Cited

U.S. PATENT DOCUMENTS

| | | | |
|---|---|---|---|
| 2,040,263 | 5/1936 | Layne et al. | 279/8 X |
| 2,125,005 | 7/1938 | Jearum | 408/146 X |
| 3,159,081 | 12/1964 | Erikson | 409/232 |
| 3,195,909 | 7/1965 | Winnen | 408/239 R X |
| 3,528,670 | 9/1970 | Wale | 279/8 |
| 3,719,367 | 3/1973 | Babuska | 279/15 X |
| 4,040,765 | 9/1977 | Vig | 409/234 X |
| 4,133,545 | 1/1979 | Komori | 279/83 |
| 4,437,801 | 3/1984 | Lewis | 409/232 |

FOREIGN PATENT DOCUMENTS

| | | | |
|---|---|---|---|
| 1929696 | 12/1969 | Fed. Rep. of Germany | 279/15 |
| 2137124 | 10/1984 | United Kingdom | 279/7 |

*Primary Examiner*—Z. R. Bilinsky
*Attorney, Agent, or Firm*—Koda and Androlia

[57] ABSTRACT

A milling cutter having an internal thread in the end face of a shank thereof for preventing accidental detachment, wherein a small-diameter thread part provided in one end of an adapter is screwed in to the internal thread set forth above while a large-diameter thread part, or a large-diameter rod part provided in the other end of the adapter is screwed in to an internal thread, or inserted into a hole respectively arranged on the axis of a chuck, the rod part being secured with a set screw.

3 Claims, 3 Drawing Sheets

MILLING CUTTER

BACKGROUND OF THE INVENTION

The present invention relates to a milling cutter employed for milling work and particularly to protecting the milling cutter from accidental detachment during cutting.

It has generally occurred that a milling cutter, such as an end mill or the like, which is attached to a milling chuck for use, while being under intensive stress exerted towards being detached from the milling chuck during cutting operation, becomes loosened off by resisting the gripping strength of the milling chuck, which results in excessive cutting in the workpiece and finally in detaching from the milling chuck. It is known in the prior art to provide a milling cutter 1, as shown in FIG. 6, which has an external thread 2a in the end of a shank 2 to prevent accidental detachment. The milling cutter 1 is attached through a sleeve 4 and a collet 5 to the inside of a chuck body 3 and positioned in the direction of insertion such that the end face 2b touches a raised center part 3a on the chuck body 3, wherein the external thread 2a tightly fits an internal thread of the collet 5 by mating so as to prevent detachment and also, the collet 5, when the milling cutter 1 rotates against the collet 5, will move in the outward direction so as to securely hold the shank 2 of the milling cutter 1 by means of a tapered contacting area thereof being against the sleeve 4. It appears that, because a straight part of the shank 2 in the prior art milling cutter 1 is shortened by sparing for the external thread 2a, the effective shank length for gripping effectively becomes shorter as compared with the entire shank length, and hence, the gripping area for transmitting rotary torque will be reduced, which may cause a tendency of slipping since the gripping strength is decreased and also a common occurrence of so-called trembling, resulting in incorrectness of the machining accuracy. Thus, a specific chuck whose construction is complicated in structure, as shown in FIG. 6, has been required for use, in which the adjustment of the milling cutter 1 for positioning towards the axis thereof cannot be made against the chuck body 3. As shown in FIG. 7, when a milling cutter 6 with a small diameter, similar to the one as set forth above, is gripped by a prior art milling chuck, a collet 8 which includes an internal thread part 8a for mating with an external thread part 7a of the milling cutter 6 and another internal thread part 8b for accepting a bolt 9 that faces the end face 7b is required, wherein the disadvantages are such that the effective shank length is short and a construction of the collet 8 is somewhat complicated. Additionally, the external threads 2a, 7a provided respectively in the milling cutters 1, 6 of the prior art are exposed such that damage to the threads 2a, 7a may be inevitable in falling or collision, whereby will result in high disposal rates of such expensive milling cutters 1, 6. Accordingly, great care should be taken to handle and maintain the milling cutters 1, 6, whereby the efficiency of working may be decreased.

By any possible means, it is known in the prior art to offer the problems associated with the milling cutters 1, 6 having the external threads 2a, 7a respectively, and thus, wherein the effective shank length is shortened such that the gripping strength and rigidity may be decreased and handling may be not as much as with a milling cutter having a straight shank without any external thread.

SUMMARY OF THE INVENTION

It is an object of the present invention, which intends to solve the problems as set forth above, to provide a milling cutter which is protected from accidental detachment and can be handled as much as a common milling cutter not protected from detachment, and in which the gripping strength and rigidity will not be decreased.

Other objects and features of the present invention will become apparent from the description which proceeds hereinafter with reference to the accompanying drawings.

DETAILED DESCRIPTION OF THE PREFERRED EMBODIMENT

The present invention is hereinafter described in accordance with one preferrred embodiment of the same.

Figure 1:
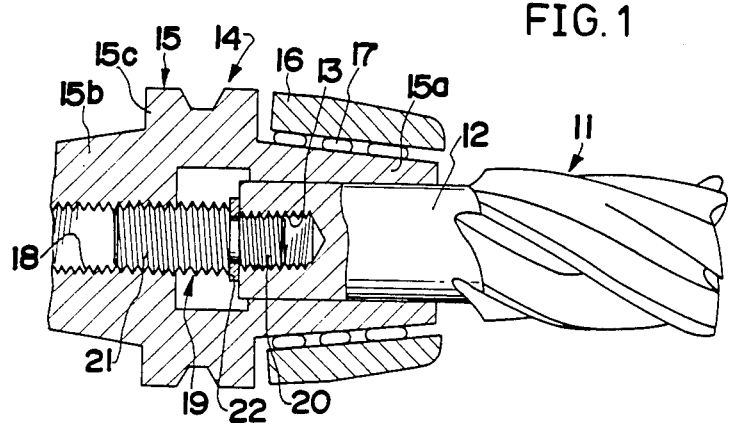
FIG. 1 is a cross-sectional view illustrating one embodiment of the milling cutter of the present invention which is attached to a chuck.

As shown in FIG. 1, a milling cutter 11 has an internal thread 13 of the determined measurements in diameter and depth provided in the center of the end face of a shank 12. A chuck 14 comprising a chuck body 15, a tightening ring 16 and needle bearings 17, is provided to hold the milling cutter 11 by gripping through the needle bearings 17 with the tightening ring 16 being turned for tightening, the milling cutter 11 being attached to the inside of a chuck cylinder 15a of the chuck body 15. 15b is a tapered shank and 15c is a holding part for being held by a manipulator; the tapered shank 15b has an adjusting internal thread 18 in the center thereof. It is generally known that such a kind of chuck has the adjusting internal thread 18 which is (utilized for adjusting the inserting depth of a tool inserted in the chuck cylinder 15a while a suitable bolt has been screwed in to a proper location thereon.

19 is an adapter comprising a small-diameter thread part 20 which fits the internal thread 13 of the shank 12 and a large-diameter thread part 21 which fits the internal thread 18 respectively the adapter 19 being secured together by means of the small-diameter thread part 20 thereof tightly screwed into the internal thread 13 with a spring washer. The large-diameter thread part 21 includes a tool hook for turning, as not shown in FIG. 1. While in the arrangement, the shank 12 of the milling cutter 11, which is inserted in the chuck cylinder 15a, is rotated such that the large-diameter thread part 21 of the adapter 19 is screwed into the adjusting internal thread 18 for positioning the milling cutter 11 to a proper depth, and then gripped securely by means of the tightening ring 16 turned. These internal thread 13, adjusting internal thread 18, small-diameter thread part 20 and large-diameter thread part 21 are threaded in the same direction (righthand thread in this embodiment of the present invention) as the thread in the milling cutter 11, whereby the milling cutter 11 will be forced under thrust so as to move towards the inside of the chuck 14 according to the rotating direction of loaded torque exerted on the milling cutter 11 during cutting operation.

In the embodiment described above, the milling cutter 11 is protected from accidental detachment by the use of the internal thread 13 of the shank 12 and additionally, the shank 12 is gripped by the chuck cylinder 15a throughout the entire length thereof such that the gripping strength and rigidity on the whole is not decreased. Even if the gripping strength is insufficient through the tightening ring 16 being improperly tightened, the milling cutter 11 can in no way be detached because it rotates such that the large-diameter thread part 21 is screwed into the adjusting internal thread 18. Additionally, it becomes easier in this preferred embodiment to adjust the inserting depth of the milling cutter 11, to fabricate the adapter 19 having a simple structure, and to provide the adjusting internal thread 18 in the chuck body 15, meanwhile, the adjusting internal thread 18 being generally provided in a prior art milling chuck so as to eliminate the extra process of making the same. This milling cutter 11 has as much a periphery as of a prior art milling cutter, whereas providing the internal thread 13 for preventing accidental detachment, so as to be handled as much as the prior art milling cutter not protected from detachment.

Figure 2:
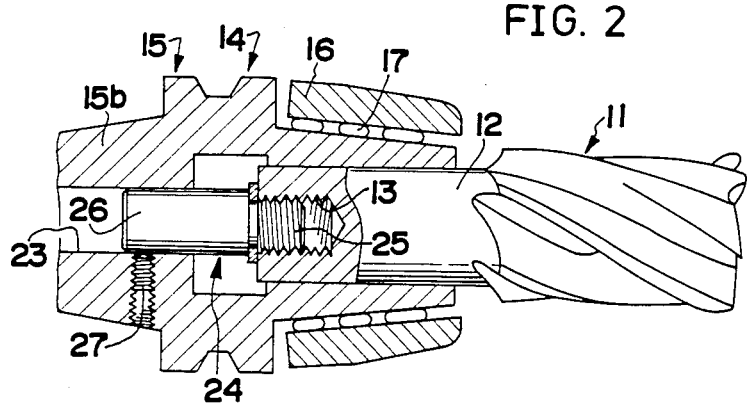
FIG. 2 through FIG. 4 are views similar to FIG. 1 and illustrate alternative embodiments of the present invention.

FIG. 2 illustrates another embodiment of the present invention being arranged in a relationship between an adapter and a chuck body wherein the adapter 24 comprising a small-diameter thread part 25 and a large-diameter rod part 26, is inserted with the large-diameter rod part 26 thereof in a fitting hole 23 of the chuck body 15 and secured with a set screw 27. When each structure of the adapters 19, 24 comprises two(2) separate parts, one part for attaching to the milling cutter 11 and the other part for attaching to the chuck body 15, as not shown in the Figures, which fit and fasten one another by turning a predetermined degree of angle so as not to separate in the tensile direction, replacement, removal and exchange of tools will be easily and quickly made once the milling cutter 11 has been placed into the chuck 14 and adjusted accordingly.

Figure 3:
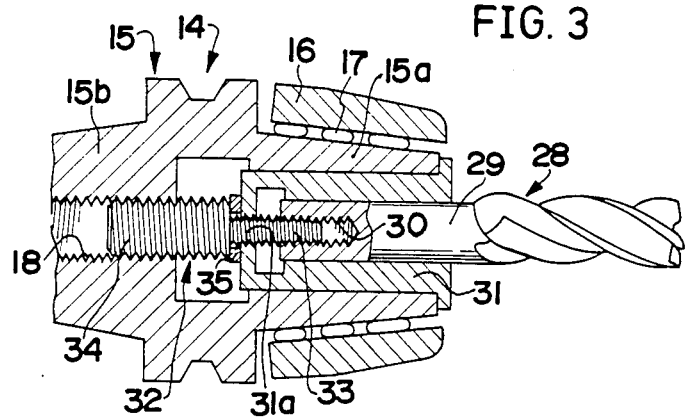

FIG. 3 illustrates still another embodiment of the present invention being arranged with a collet 31 for holding a small-diameter milling cutter 28 of which shank 29 has an internal thread 30 and the collet 31 has an internal thread part 31a threaded in the same pitch and diameter as of the internal thread 30. The adapter includes a small-diameter thread part 33 which fits the internal thread 30 through the internal thread part 31a and a large-diameter thread part 34 which fits an adjusting internal thread 18, is incorporated by means of the small-diameter thread part 33 screwed into the internal thread part 31a of the collet 31 together with a washer 35 and securely held by means of a tightening ring 16 while the large-diameter thread psrt 34 and the internal thread 30 of the shank 29 have screwed in to the adjusting internal thread 18 and the small-diameter thread part 33 respectively in position. In this embodiment of the present invention, the milling cutter 28 is still protected from accidental detachment and the shank 29 is held throughout the entire length thereof such that the gripping strength may not be decreased. Said small-diameter milling cutter 28 can be attached to the chuck body 15 of the embodiments as set forth above by employing the suitable adapter 32 and the collet 31 which has the internal thread part 31a, whereby a construction of the arrangement becomes simple and will be easily fabricated and handled.

Figure 4:
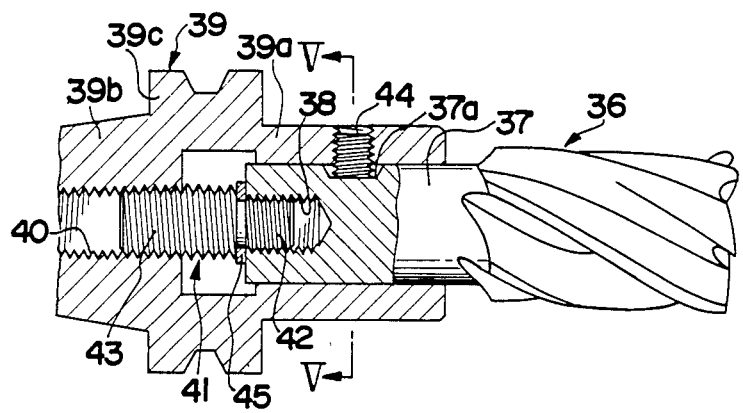
Figure 5:
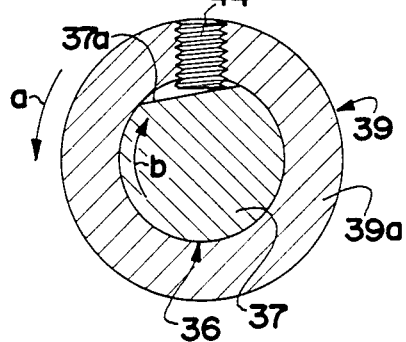
FIGS. 5A and 5B are enlarged cross-sectional views taken on the line V—V of FIG. 4.
Figure 5:
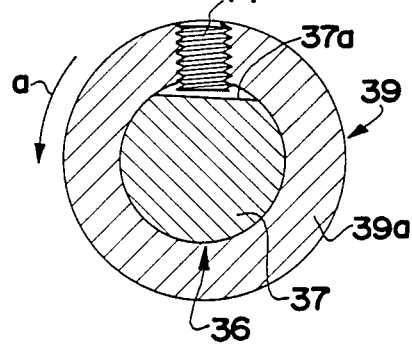

FIG. 4 illustrates still another embodiment of the present invention being directed towards a so-called side-lock type milling cutter 36 which has an internal thread 38 therein and also a flat part 37 on a shank thereof. The milling cutter 36 is inserted in a chuck cylinder 29a of a chuck 39 for attaching so as to be joined into an adjusting internal thread 40 of a tapered shank 39b through an adapter 41 which comprises a small-diameter thread part 42 and a large-diameter thread part 43 and then held by securely tightening a lock screw 44 against the flat part 37a of the shank 37, the lock screw 44 being attached to the chuck cylinder 39a. As shown in FIG. 4, 39c is a gripping part and 45 is a washer. In this embodiment of the present invention, the milling cutter 36 is still protected from accidental detachment and the gripping strength and rigidity will not be decreased. Especially, when the lock screw 44 becomes loosened in the prior art, a prior art milling cutter may be detached and hence, will cause serious damage as compared with this embodiment wherein the adapter 41 is screwed in to the adjusting internal thread 40 such that the milling cutter 36 is forced to stay inside the chuck 39 and hence, prevents serious damage. In an example of how the lock screw 44 becomes loosened, as shown in FIG. 5a, when the chuck 39 rotates in the direction as marked "a" with the shank 37 which has been secured by the lock screw 44 of which end face oriented at an angle to the flat part 37a thereof, the milling cutter 36 will be under the counter-loads in cutting and thus, of which shank 37 may be rotated in the opposite direction "b" of the chuck 39 such that loosening of the lock screw 44 results as shown in FIG. 5B. As compared with a prior art side-lock type milling cutter which causes such incident time to time, this embodiment of the present invention is disclosed which has a failsafe feature for extra safety.

The present invention discloses the possible application to a chuck having an axial groove in the internal periphery of the chuck cylinder 15a of the chuck body 15, a chuck 14 employing needle bearings 17, and a chuck having a side-lock arrangement including the chuck 39.

Figure 6:
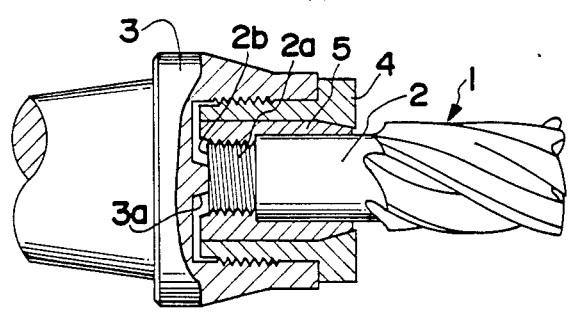
FIGS. 6 and 7 are cross-sectional views illustrating milling cutters disclosed in the prior art.
Figure 7:
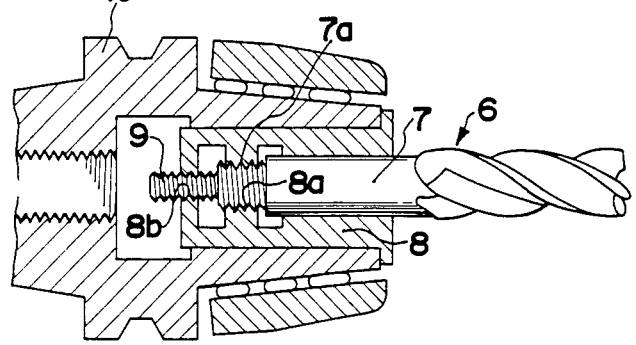

Additionally, the present invention discloses that the milling cutters 1, 6 having the external threads 2a, 7a respectively as shown in FIGS. 6, 7, can be attached to the chuck 14 shown in FIG. 1 or 3 by means of the adapters 19,24,32. Such a construction wherein the inserting depth of a milling cutter can be easily adjusted and accidental detachment can be prevented without the use of a specific chuck such as shown in FIG. 6, will have a fail-safe feature for safety even if the gripping strength is decreased.

It appears from the description of the present invention as set forth above that a milling cutter is protected from accidental detachment by means of an internal thread provided in a shank thereof for preventing detachment, that the effective shank length is not decreased since the periphery of the shank remains unchanged with an internal thread such that the gripping strength and rigidity are not decreased, and that, because no thread is exposed as compared with an external thread in a prior art milling cutter, no specific handling is required for preventing damage to the internal threads and as a result handling can be made in the same manner as with a common milling cutter which is not protected from accidental detachment, which results in keeping a high rating of working efficiency.

What is claimed is:

1. A milling cutter wherein an internal thread is provided at the center of an end face of the shank of said cutter for preventing accidental detachment thereof, said shank being inserted into a chuck cylinder of a chuck body and chucked at a desired position in an axial direction of said chuck cylinder by a tightening ring via a needle bearing, said tightening ring being provided on the outer circumferential surface of said chuck cylinder, and wherein an adapter is provided between said shank and chuck body, said adapter being provided at one end with a small-diameter threaded part which fits said internal thread and at the other end with a large-diameter threaded part which is adjustable in the axial direction of said chuck cylinder and fits an internal thread which is provided in said chuck body along the axis, and said internal threads and threaded parts being threaded so that they are screwed into each other in the same direction as the direction of the load of a cutting torque which is given to the blade of said cutter.

2. A milling cutter wherein an internal thread is provided at the center of an end face of the shank of said cutter for preventing accidental detachment thereof, said shank being inserted into a chuck cylinder of a chuck body via a collet and chucked at a desired position in an axial direction of said chuck cylinder by a tightening ring via a needle bearing, said tightening ring being provided on the outer circumferential surface of said chuck cylinder, and wherein an adapter is provided between said shank, chuck body and collet, said adapter being provided at one end with a small-diameter threaded part which fits said internal thread of said shank and an internal thread provided in said collet and at the other end with a large-diameter threaded part which is adjustable in the axis direction of said chuck cylinder and fits an internal thread which is provided in said chuck body along the axis, and said internal threads and threaded parts are threaded so that they are screwed into each other in the same direction as the direction of the load of a cutting torque which is given to the blade of said cutter.

3. A milling cutter wherein an internal thread is provided at the center of an end face of the shank of said cutter for preventing accidental detachment thereof, said shank being inserted into a chuck cylinder of a chuck body and chucked at a desired position in an axial direction of said chuck cylinder by an end face of a side lock screw which is provided in said chuck cylinder, said end face being firmly pressed against a flat part of said shank, and wherein an adapter is provided between said shank and chuck body, said adapter being provided at one end with a small-diameter threaded part which fits said internal thread and at the other end with a large-diameter threaded part which is adjustable in the axial direction of said chuck cylinder and fits an internal thread provided in said chuck body along the axis, and said internal threads and threaded parts are threaded so that they are screwed into each other in the same direction as the direction of the load of a cutting torque which is given to the blade of said cutter.

* * * * *